United States Patent
Chen et al.

(10) Patent No.: US 9,373,154 B2
(45) Date of Patent: Jun. 21, 2016

(54) IMAGE PROCESSING APPARATUS HAVING REDUCED LINE BUFFER SIZE AND ASSOCIATED METHOD

(71) Applicant: MStar Semiconductor, Inc., Hsinchu Hsien (TW)

(72) Inventors: Chung-Yi Chen, Puli Township (TW); Yu-Jen Wang, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 299 days.

(21) Appl. No.: 13/897,538

(22) Filed: May 20, 2013

(65) Prior Publication Data

US 2013/0314428 A1  Nov. 28, 2013

(30) Foreign Application Priority Data

May 23, 2012 (TW) .............................. 101118385 A (51) Int. Cl.
*G06T 1/60* (2006.01)
(52) U.S. Cl.
CPC ....................................... *G06T 1/60* (2013.01)
(58) Field of Classification Search
None
See application file for complete search history.

(56) References Cited

U.S. PATENT DOCUMENTS

| 4,894,646 A | * | 1/1990 | Ryman | ..................... G06T 1/60 345/537 |
| 8,531,546 B2 | * | 9/2013 | Sasaki | ......................... 348/222.1 |
| 2008/0049037 A1 | * | 2/2008 | Kurupati | ....................... 345/560 |

FOREIGN PATENT DOCUMENTS

| CN | 101495952 A | 7/2009 |
| TW | 200820213 A | 5/2008 |

OTHER PUBLICATIONS

Taiwan Office Action, Jan. 16, 2015, 6 pages.
SIPO Office Action, Apr. 15, 2016, 6 pages.

* cited by examiner

*Primary Examiner* — Maurice L McDowell, Jr.
*Assistant Examiner* — Donna J Ricks
(74) *Attorney, Agent, or Firm* — Edell, Shapiro & Finnan, LLC (57) ABSTRACT

An image processing apparatus includes a first memory, a second memory, a buffer, a fetching module and a processing module. The first memory module stores an original image having a first width. The buffer has a second width smaller than the first width. The fetching module fetches a sub-image of the original image from the first memory and stores the fetched sub-image into the buffer. The processing module performs an image processing process on the sub-image stored in the buffer to generate a processed sub-image. The processed sub-image is then stored into the second memory.

14 Claims, 6 Drawing Sheets

IMAGE PROCESSING APPARATUS HAVING REDUCED LINE BUFFER SIZE AND ASSOCIATED METHOD

This application claims the benefit of Taiwan application Serial No. 101118385, filed May 23, 2012, the subject matter of which is incorporated herein by reference.

BACKGROUND OF THE INVENTION

1. Field of the Invention

The invention relates in general to an image processing technique, and more particularly to a technique for managing/utilizing a memory in an image processing system.

2. Description of the Related Art

Accompanied with the ubiquity of various electronic products, multimedia systems such as home theaters are now prevalent in households. In many multimedia systems, one of the most important hardware devices is an image display apparatus. To satisfy viewer demand for realistic images, one dominant development trend is the continuously increasing size and resolution of an image. In general, large-size and high-resolution image display equipment needs to be equipped with higher operational speed and greater memory capacity.

Figure 1A:
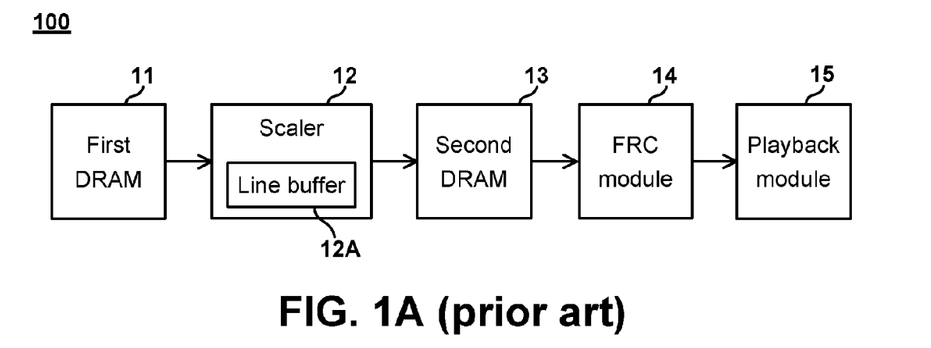
FIG. 1A is an exemplary block diagram of a conventional image display equipment.

FIG. 1A shows an exemplary block diagram of an image display equipment. A scaler 12 scales a size of an input image to match a size/ratio of the scaled image with the standards of a playback module 15, and performs image processing processes such as brightness adjustment, contrast adjustment and sharpening. As shown in FIG. 1A, the input image is first stored in a first dynamic random access memory (DRAM) 11. The scaler 12 is generally designed to process image data of the input image in a unit of a row. Thus, the scaler 12 includes a line buffer 12A for temporarily storing row data fetched from the first DRAM 11. For example, if a resolution of the input image is 1920(row)*1080(column) pixels, the width of the line buffer 12A needs to at least accommodate image data of 1920 pixels.

The scaler 12 sequentially generates the row image data of the scaled image, and stores the generated data into a second DRAM 13. After the scaled image is completely stored into the second DRAM 13, a frame rate conversion (FRC) module 14 accesses the scaled image from the second DRAM 13 and provides the scaled image to the playback module 15. If the frequency of inputting the input image is different from the display frequency of the playback module 15, the FRC module 14 deletes the redundant image or generates and inserts the deficit image, such that the image frequency outputted to the playback module 14 matches the setting of the playback module 15.

Figure 1B:
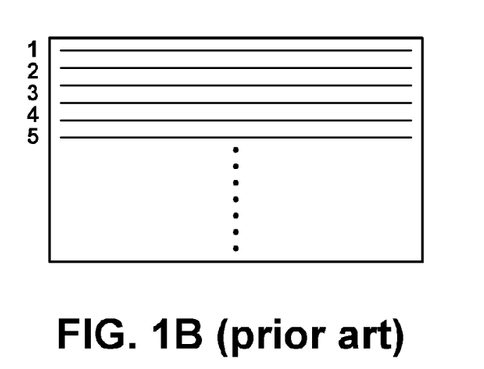
FIG. 1B is a schematic diagram of pixels indicated in rows in an image.

Conventionally, if the resolution of the input image is increased from 1920*1080 pixels to 3840*2160 pixels, the width of the line buffer 12 needs to be correspondingly augmented to accommodate image data of 3840 pixels from 1920 pixels. If the image processing process performed by the scaler 12 takes neighboring pixels of the vertical direction into consideration, the line buffer 12A is mandated to temporarily store image data of several rows of pixels at the same time. For example, to process the third-row data in FIG. 1B, image data of the first-row to the fifth-row pixels (with data of the first, second, fourth and fifth rows serving for auxiliary purposes) are temporarily stored in the line buffer 12A at the same time. Thus, it is seen that the absolute value of the capacity of the line buffer 12A must be significantly increased given that the resolution of the input image is increased.

SUMMARY OF THE INVENTION

The invention is directed to an image processing apparatus and associated method for reducing hardware costs of a buffer. In the image processing apparatus and associated method of the present invention, an original image is divided into sub-images having a smaller width to achieve the goal of a reduced buffer. In a situation of a reduced buffer capacity, the image processing apparatus and associated method of the present invention is capable of maintaining the same image quality without increasing an operational speed.

According to an embodiment the present invention, an image processing apparatus is provided. The processing apparatus includes a first memory, a second memory, a buffer, a fetching module and a processing module. The first memory stores an original image having a first width. The buffer has a second width smaller than the first width. The fetching module fetches a sub-image of the original image from the first memory, and stores the fetched sub-image into the buffer. The processing module performs an image processing process on the sub-image stored in the buffer to generate a processed sub-image, and stores the processed sub-image into the second memory.

According to another embodiment of the present invention, an image processing method is provided. The method includes steps of: storing an original image having a first width into a first memory; fetching a sub-image of the original image from the first memory, and storing the fetched sub-image into a buffer, wherein the buffer has a second width smaller than the first width and the sub-image has a width smaller than or equal to the second width; performing an image processing process on the sub-image stored in the buffer to generate a processed sub-image; and storing the processed sub-image into a second memory.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 2:
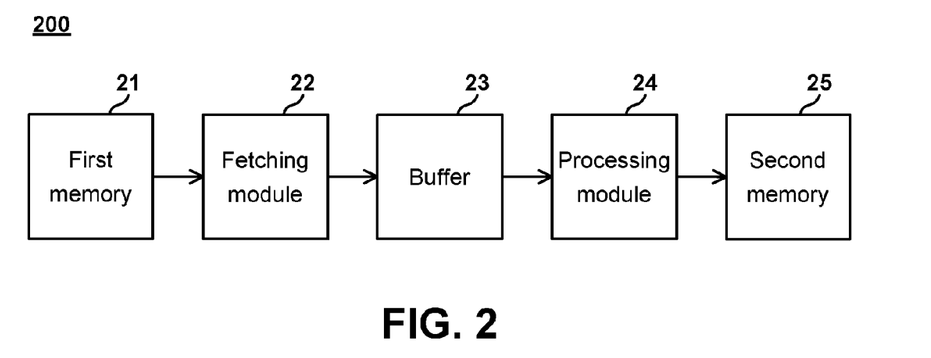
FIG. 2 is a block diagram of an image processing apparatus according to an embodiment of the present invention.

FIG. 2 shows an image processing apparatus 200 according to an embodiment of the present invention. The image processing apparatus 200 includes a first memory 21, a fetching module 22, a buffer 23, a processing module 24 and a second memory 25. In practice, the image processing apparatus 200 may be integrated into various types of image processing systems or image processing equipments, or may be an independent unit. In practice, the first memory 21 and the second memory 25 may be different regions in a same memory, or may be in two different memories. In the descriptions below, for example, the image processing apparatus 200 receives 30 original images having a size of 3840(row)*2160(column) pixels per second.

Figure 3A:
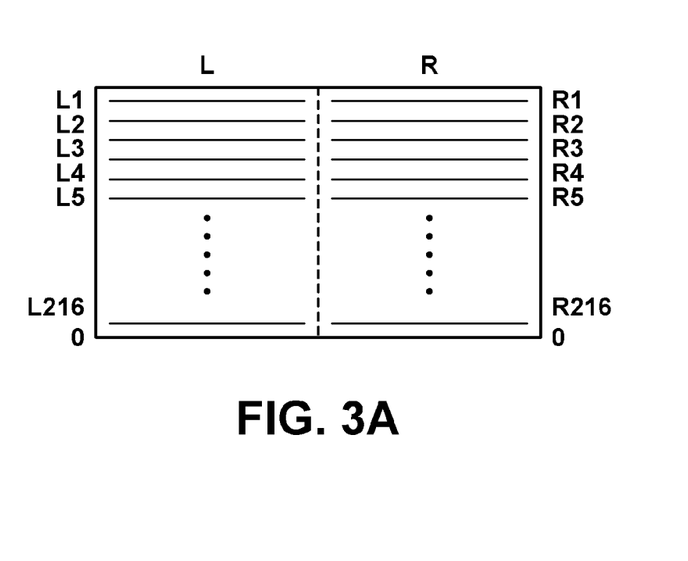
FIG. 3A and FIG. 3B are examples of dividing an original image and a processed image into two regions according to a vertical central line.

The original image received by the image processing apparatus 200 is first stored in the first memory 21. The first memory 21 has a capacity for storing at least pixel data of 3840*2160 pixels, i.e., the image pixel data of one original image. Different from the conventional solution, the fetching module 22 of the present disclosure does not fetch the image data from the first memory 21 in a unit of one row (i.e., 3840*1 pixels). Referring to FIG. 3A, in this embodiment, the original image is virtually divided into a left region L and a right region R along a vertical central line, and so each pixel row is divided into two (e.g., each pixel row includes a left half row L1 and a right half row R1 of one 1920-pixel row). The fetching module 22 first fetches the data in the left region L and then fetches the data in the right region R. For example, the fetching module 22 fetches the data as a sequence of L1, L2, L3, . . . , L2160, R1, R2, R3, . . . , and R2160 in a unit of 1920*1 pixels for a total of 4320 times.

The fetching module 22 may be regarded as fetching one sub-image of the original image each time, and the sub-image is temporarily stored into the buffer 23 for the use of the processing module 24. The processing module 24 performs an image processing process on each sub-image stored in the buffer 23 to generate a processed sub-image, e.g., to generate a processed left half row L1' according to a left half row L1 stored in the buffer 23. For example, the image processing process performed by the processing module 24 includes scaling, brightness adjustment, contrast adjustment and sharpening. After the processing module 24 generates the left half row L1' and stores the left half row L1' into the second memory 25, the fetching module 22 continues to fetch the image data of a left half row L2 from the first memory 21 to the buffer 23 for the processing module 24. The image processing is similarly performed by the processing module 24 until the processing module 24 generates a right half row R2160' and stores the right half row 2160' into the second memory 25.

Figure 3B:
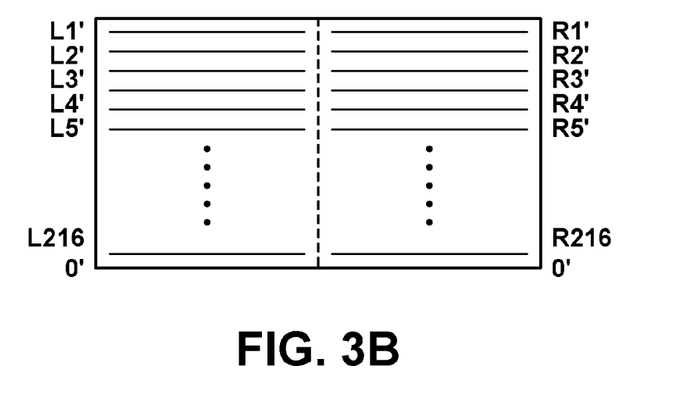

In this embodiment, the processing module 24 stores the processed sub-images, e.g., L1', L2', L3', . . . , L2160', R1', R2', R3', . . . , and R2160', into the second memory 25 according to the sequence that the fetching module 22 fetches the image data, and the processed sub-images are combined into a complete processed image in the second memory 25 as shown in FIG. 3B. The capacity of the second memory 25 is associated with the size of the processed image, i.e., the second memory 25 is capable of at least storing image data of one processed image.

It is seen from the descriptions of the embodiment that the sub-image fetched and stored into the buffer 23 by the fetching module 22 each time has a width of 1920 pixels, and so the width of the buffer 23 only needs to accommodate 1920 pixels rather than the original image width (3840 pixels) of one row of the original image. In other words, the width of the buffer 23 is much smaller than the width of the original image. In practice, the processing module 23 may be designed to complete image processing corresponding to a half of the original image every 1/60 second, such that the data processing amount of the processing module 24 within unit time equals the data processing amount within unit time when processing one entire original image every 1/30 second. Compared to a conventional solution, although the capacity of the buffer 23 is halved, the operational speeds of the circuit blocks are not mandated to double from the original operational speeds while also maintaining the image quality.

It should be noted that the size and/or fetching sequence of the sub-images each time fetched by the fetching module 22 from the first memory 21 is not limited to the above example. For example, an original image may be virtually divided into more regions according to vertical central lines or horizontal lines, and the regions need not be equal in size. Alternatively, the fetching module 22 may first fetch the data in the right region R and then fetch the data in the left region L. Alternatively, the fetching module 22 may start fetching the data L2160, L2159, L2158 . . . from the lower part of the image. In the above examples, the fetching module 22 only starts to fetch the sub-images located in the right region after all the sub-images in the left region are fetched. In practice, the fetching sequence of the fetching module 22 may be L1, R1, L2, R2, L3, R3, . . . , L2160 and R2160. Moreover, the height of the sub-images fetched by the fetching module 22 is not limited to one pixel. The width of the buffer 23 can be reduced given that the width of the sub-image each time fetched by the fetching module 22 is smaller than the width of the original image.

Figure 3C:
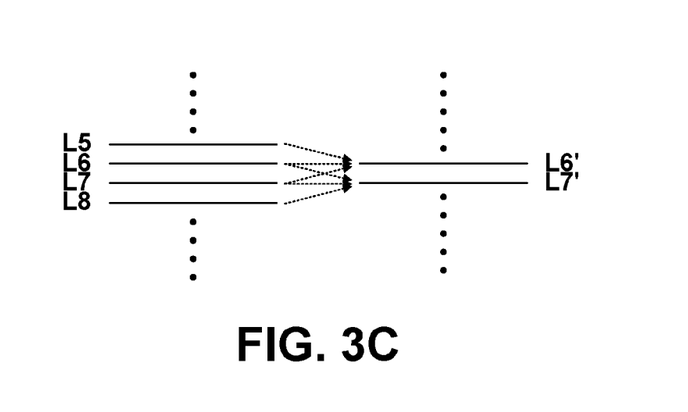
FIG. 3C is an example of generating one row of processed pixels according to multiple rows of original pixels.

Further, the content of the sub-image fetched by the fetching module 22 is not limited to one row of original pixels. For example, the processing module 24 may be designed to concurrently generate R rows of processed pixels according to P rows of original pixels, where P and R are respectively a positive integer, and R is smaller than or equal to P. FIG. 3C shows an example of generating one row of processed pixels according to three rows of original pixel. In this example, to generate the sixth-row pixels L6' at the left half of the processed image, the fetching module 22 fetches the fifth to seventh rows of pixels (L5 to L7) at the left half of the original image to the buffer 23 for the processing module 24. To generate the seventh-row pixels L7' at the left half of the processed image, the fetching module 22 fetches the sixth to eighth rows of pixels (L6 to L8) at the left half of the original image to the buffer 23 for the processing module 24. In other words, apart from considering the sixth-row pixels L6 corresponding to the physical location of the sixth-row pixels L6' of the processed sub-image, the processing module 24 further refers to the image data of adjacent rows of the left half row L6. In practice, to generate the processed left half row L7' of the processed image, the fetching module 22 again captures left half rows L6 to L8 from the first memory 21 to be the original sub-image. Alternatively, the fetching module 22 preserves the left half rows L6 and L7 in the buffer 23 and only fetches the left half row L8 from the first memory 21, such that the left half rows L6 to L8 form the original sub-image in the buffer 23 for generating the processed left half row L7'. Such approach is advantaged by providing a reduced amount of data flow.

Figure 4A:
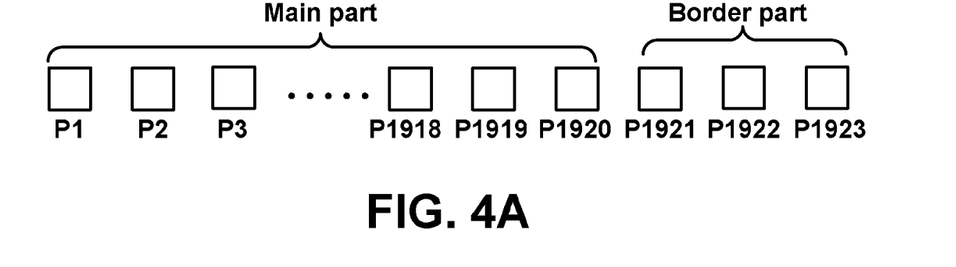
FIG. 4A and FIG. 4D are examples of a main part and a border part forming a sub-image.

According to another embodiment of the present invention, the sub-image fetched by the fetching module 22 each time includes a main part and a border part. Referring to FIG. 4A, taking the foregoing situation of generating the processed left half row L7' according to the left half row L7 for example, the image fetched and stored into the buffer 23 by the fetching module 22 includes a main part consisting of pixels P1 to P1920, and a border part consisting of pixels P1921 to P1923. It should be noted that the above numbers of the pixels of the main part and the border part are examples rather than limitations to the present invention. In practice, the main part is the left half row L1 originally depicted in FIG. 3A, and the border part is three leftmost pixels of the right half row R1.

Figure 4B:
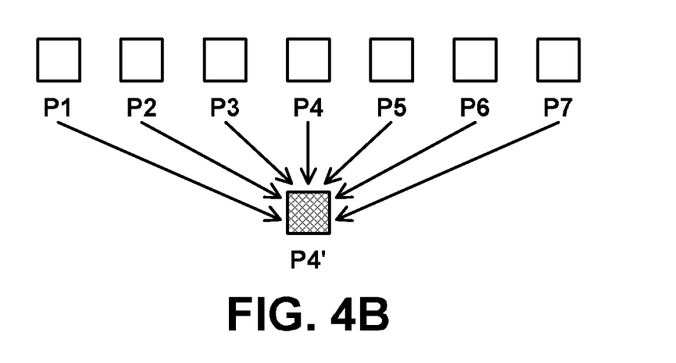
FIG. 4B and FIG. 4C depict relations of original pixels and processed pixels.
Figure 4C:
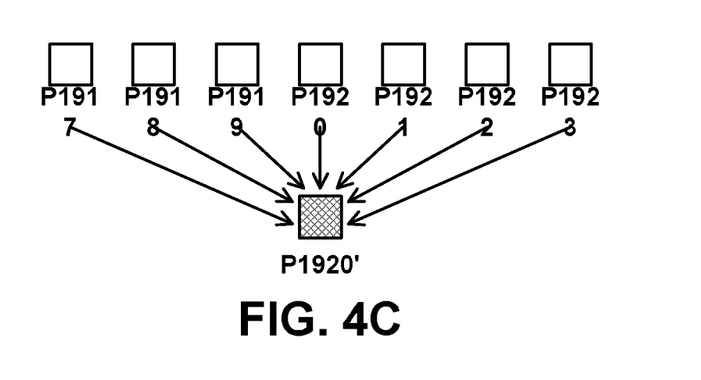
Figure 4D:
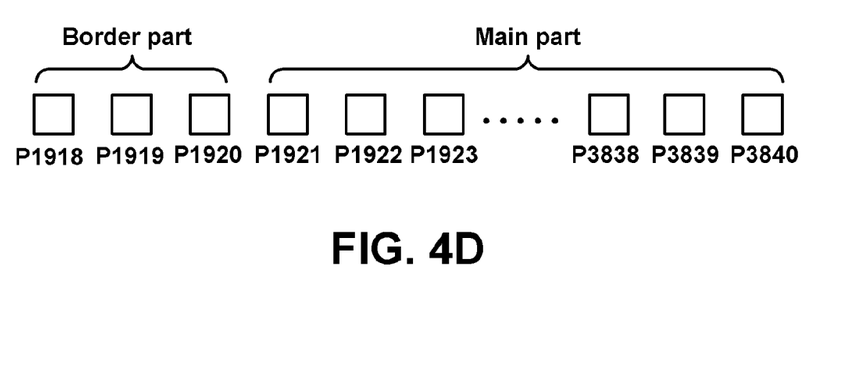

By additionally fetching the border part, a possibility of causing discontinuity in the image when the fetching module 22 fetches image data in a unit other than a row can be prevented, particularly in the situation where the image processing performed by the processing module involves neighboring horizontal pixels as reference data. Assume that the image processing performed by the processing module 24 involves three pixels at the left and right of one specific pixel, respectively. Referring to FIG. 4B, for example, to generate a processed pixel P4' corresponding to a pixel P4, in addition to the pixel P4, pixels P1 to P3 and pixels P5 to P7 are also considered as reference data. Theoretically, as shown in FIG. 4C, to generate the processed pixel P1920' corresponding to the pixel 1920, in addition to the pixel P1920, the pixels P1917 to P1919 and the pixels P1921 to P1923 are also considered as reference data. Thus, the fetching module 22 also temporarily stores the pixels P1921 to P1923 to the buffer 23 for reference of the processing module 24. Similarly, to generate the processed right half row R1', the image data fetched and stored into the buffer 23 by the fetching module 22 includes the main part formed by the pixels P1921 to P3840 and the border part formed by the pixels P1918 to P1920, as shown in FIG. 4D.

It is seen from the above example that the border part of a specific sub-image is at the same time the main part of another sub-image different from the sub-image. In response to the situation where each sub-image includes a border part, the capacity of the buffer 23 is correspondingly augmented to be sufficient for accommodating the main part and the border part of the sub-image. Taking the above embodiment for instance, the original image includes 3840 columns of original pixels; the main part of each sub-image includes 1920 columns of original pixels and the border part includes 3 columns of original pixels. Therefore, the buffer 23 may be designed to accommodate image data of 1923 pixels. It can be easily appreciated that, by additionally capturing the border part of each sub-image, the processed image generated by the processing module 24 is the same as that when employing a buffer capable of accommodating 3840 pixels, i.e., the processed image is free from image discontinuity appearing at the border parts.

In practice, selection of the border part is associated with the image processing performed by the processing module 24, and is also known in advance. The border size required by different image processing algorithms may vary, and so the fetching module 22 may accordingly predefine rules for fetching image data from the first memory. Since the width of the border part is usually quite small, the capacity of the buffer 23 is slightly increased. However, compared to the conventional solution, the image processing apparatus 200 of the present invention still offers the advantage of a reduced buffer 23. It should be noted that the concept that each sub-image includes the main part and the border part is not limited to dividing the original image into left and right regions according to a vertical central line.

Moreover, the main function of the border part is to assist in generating the processed sub-image, and so the processing module 24 is not required to perform image processing on the pixels of the border part. Taking FIG. 4C for example, after generating the processed pixel P1920', the processing module 24 does not continue performing image processing on the pixels P1921 to P1923 or storing the pixels P1921 to P1923 to the second memory 24. The range of the border part may also be known by the processing module 24. When storing the processed sub-image from the buffer 23 to the second memory 25, the processing module may delete the border part to keep only the processed pixels (e.g., P1' to P1920') corresponding to the main part.

Figure 5:
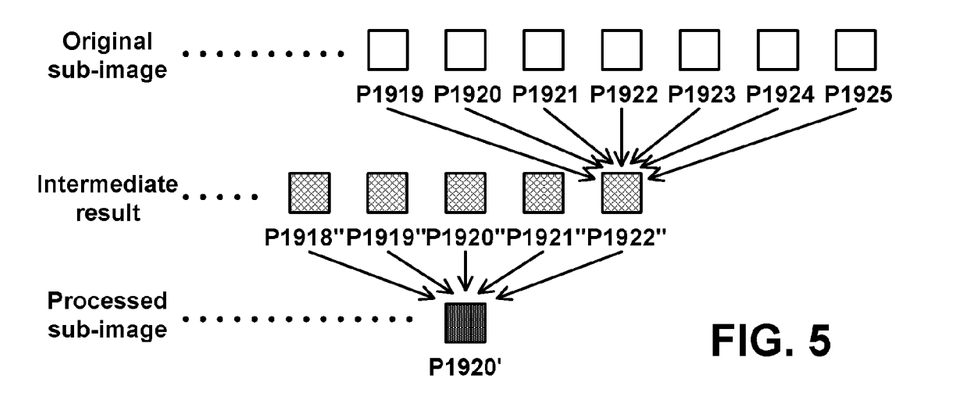
FIG. 5 depicts relations of original pixels, intermediate pixels and processed pixels.

In an embodiment of the present invention, the image processing process performed by the processing module 24 may include multiple sub-processes performed in sequence. For example, the processing module 24 may first perform a first sub-process on one sub-image to generate an intermediate result, and perform a second sub-process on the intermediate result to generate a processed sub-image corresponding to the sub-image. Assume that the first sub-processes considers three left and right pixels of a target pixel, respectively, and the second sub-process considers two left and right pixels of the target pixel, respectively. As shown in FIG. 5, to generate the pixel P1920' of the processed sub-image, pixels P1918" to P1922" of the intermediate result need to be considered; to generate the pixel P1922" of the intermediate result, the pixels P1919 to P1925 of the original sub-image need to be considered. It is seen that, if the pixel P1920' is the rightmost pixel of the processed sub-image, the fetching module 22 at least fetches P1921 to P1925 as the border part. Accordingly, the total number of pixels (or referred to as a total column number) included in the border part equals a sum of border requirement parameters of the sequentially performed sub-processes. In the above example, the sum is 3+2=5.

In practice, the image processing apparatus 200 may further include a frame rate conversion (FRC) module (not shown). The FRC module reads a processed image from the second memory 25 after the processing module 24 generates and stores the complete processed image into the second memory 25, and selectively adjusts the frame rate at which the process image is provided to a subsequent playback module.

The image processing apparatus of the present invention may also be designed to have extended capabilities for receiving and processing original images of different sizes, such as 3840*2160-pixel original images at 30 frames per second, and 1920*1080-pixel original images at 60 frames per second. In the above applications, the width of the buffer may be selected according to the smaller image size, and different parts of the original image may be sequentially fetched as sub-images according to the width of the buffer.

Figure 6:
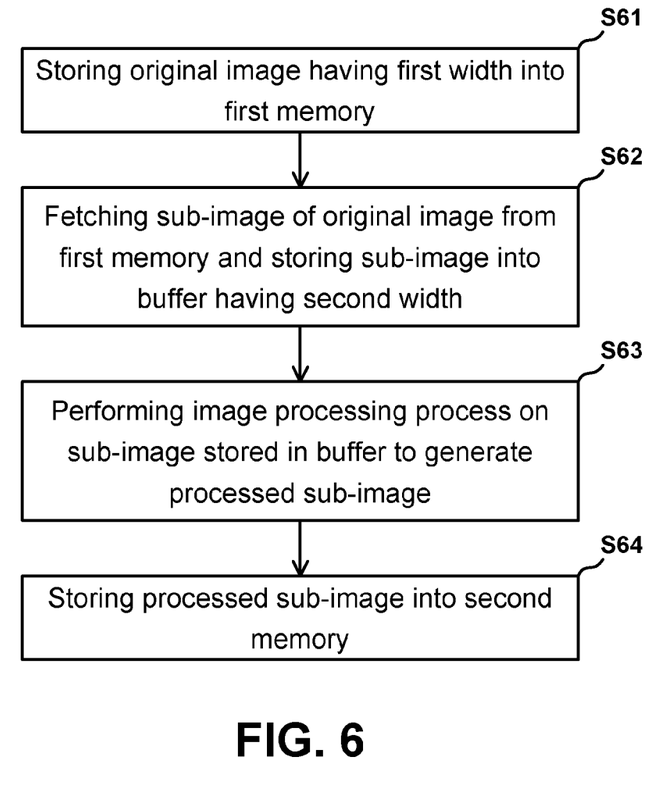
FIG. 6 and FIG. 7 are flowcharts of an image processing method according to embodiments of the present invention.

FIG. 6 shows a flowchart of an image processing method according to another embodiment of the present invention. The method beings with Step S61, in which an original image having a first width is stored into a first memory. In Step S62, a sub-image of the original image is fetched from the first memory and stored into a buffer. The buffer has a second width smaller than the first width, and the sub-image has a width smaller than the second width. In Step S63, an image processing process is performed on the sub-image stored in the buffer to generate a processed sub-image. In Step S64, the processed sub-image is stored into a second memory.

Figure 7:
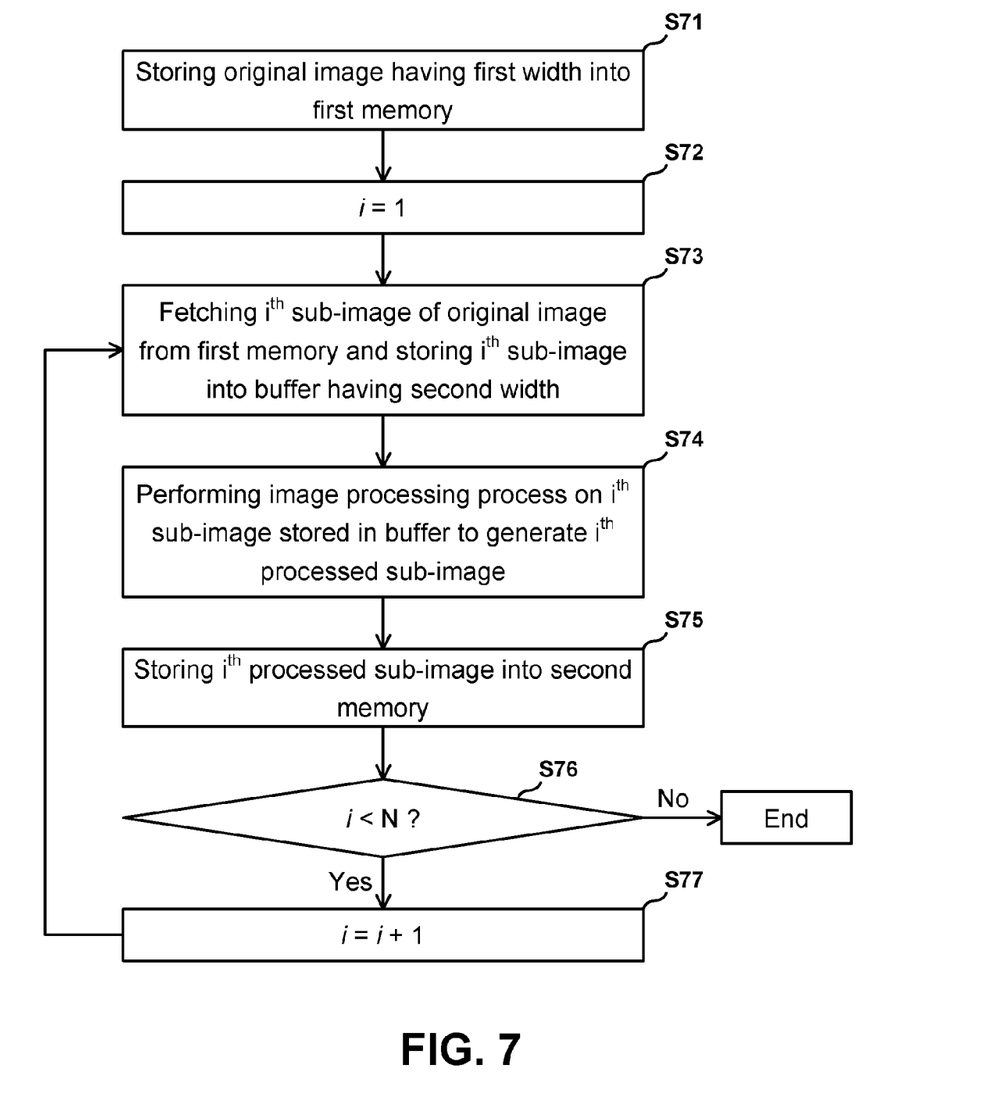

In practice, when the original image includes N sub-images (N being an integer greater than 1) having a width smaller than the second width, the process in FIG. 6 may be modified to as shown in FIG. 7. In Step S71, an original image having a first width is stored into a first memory. In Step S72, an integral index i is set to 1. In Step S73, an $i^{th}$ sub-image of the original image is fetched from the first memory and stored into a buffer. The buffer has a second width smaller than the first width, and the $i^{th}$ sub-image has a width smaller than the second width. In Step S74, an image processing process is performed on the $i^{th}$ sub-image stored in the buffer to generate an $i^{th}$ processed sub-image. In Step S75, the $i^{th}$ processed sub-image is stored into a second memory. In Step S76, it is determined whether the current integer index i is smaller than N. Step S77 is performed to set i=i+1 when a determination result of Step S76 is affirmative. Steps S73 to S76 are iterated after Step S77 until the determination result of Step S76 is negative.

In practice, given that the multiple sub-images of the original image can be sequentially processed, the range of the integer index is not necessarily set between 1 and N. Further, Step S75 may be designed as combining the N processed sub-images to a processed image corresponding to the original image in the second memory. Various modifications (e.g., approaches for virtually dividing the original image and the fetching the border part) described in association with the image processing apparatus 200 can also be applied to the image processing method in FIG. 6 and FIG. 7, and details thereof shall be omitted herein.

In conclusion, by dividing an original image into sub-images having a smaller width for processing, the image processing apparatus and associated method of the present invention achieves the goal of a reduced buffer. Under a situation of a reduced buffer capacity, the image processing apparatus and associated method of the present invention is capable of maintaining the same image quality without additionally increasing the operational speed.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing apparatus, comprising:
   a first memory, for storing an original image having a first width;
   a second memory;
   a buffer, having a second width smaller than the first width;
   a fetching module, for fetching a sub-image of the original image from the first memory and storing the sub-image into the buffer; wherein a width of the sub-image is smaller than or equal to the second width, the fetching module configured to operate with predefined rules for fetching the sub-image of the original image from the first memory; and
   a processing module, for performing an image processing process on the sub-image image to generate a processed sub-image, and storing the processed sub-image into the second memory,
   wherein the original image comprises N number of sub-images, each of the sub-images having the width smaller than the second width, and N is an integer greater than 1; and the fetching module sequentially fetches the N sub-images from the first memory to the buffer for processing by the processing module,
   wherein each sub-image comprises a main part and a border part, the border part of a first sub-image is also the main part of a second sub-image, and the border part is selected to prevent image discontinuity of processed sub-images, wherein the border part is used to perform the image processing process on the main part of the first sub-image to generate a processed sub-image, while the border part of the first sub-image itself is not processed.

2. The apparatus according to claim 1, wherein the sub-image comprises P number of rows of pixels, the processed sub-image comprises R number of rows of pixels, P and R are respectively positive integers, and R is smaller than or equal to P.

3. The apparatus according to claim 1, wherein the processing module combines the N number of processed sub-images to a processed image corresponding to the original image in the second memory.

4. The apparatus according to claim 1, wherein the original image is divided into a first side region and a second side region according to a vertical central line, and the fetching module first fetches at least one sub-image of the first side region and then fetches at least one sub-image of the second side region.

5. The apparatus according to claim 4, wherein the fetching module starts fetching the sub-images of the second side region after the sub-images of the first side region are all fetched.

6. The apparatus according to claim 1, wherein the original image comprises M number of columns of original pixels, the main part of the first sub-image comprises (M/2) number of columns of the original pixels, the border part of the first sub-image comprises Q number of columns of the original image, where M is an even number and Q is a positive integer, associated with the image processing, smaller than (M/2); and the Q columns of original pixels are for assisting generating at least one processed pixel corresponding to the (M/2) number of columns of the original pixels.

7. The apparatus according to claim 6, wherein the image processing process comprises a plurality of sequentially performed sub-processes each having a border requirement parameter, and the positive integer Q is a sum of the border requirement parameters.

8. An image processing method, comprising:
   a) storing an original image having a first width into a first memory;
   b) fetching a sub-image of the original image from the first memory and storing the sub-image into the buffer; wherein, the buffer has a second width smaller than the first width, and the sub-image has a width smaller than or equal to the second width, the fetching operating with predefined rules for fetching the sub-image of the original image from the first memory;
   c) performing an image processing process on the sub-image image to generate a processed sub-image; and
   d) storing the processed sub-image into a second memory,
   wherein the original image comprises N number of sub-images, each of the sub-images having the width smaller than the second width, and N is an integer greater than 1; and the fetching module sequentially fetches the N sub-images from the first memory to the buffer for processing by the processing module,
   wherein each sub-image comprises a main part and a border part, the border part of a first sub-image is also the main part of a second sub-image, and the border part is selected to prevent image discontinuity of processed sub-images, wherein the border part is used to perform the image processing process on the main part of the first sub-image to generate a processed sub-image, while the border part of the first sub-image itself is not processed.

9. The method according to claim 8, wherein the sub-image comprises P number of rows of pixels, the processed sub-image comprises R number of rows of pixels, P and R are respectively positive integers, and R is smaller than or equal to P.

10. The method according to claim 8, further comprising:
    combining the N number of processed sub-images to a processed image corresponding to the original image in the second memory.

11. The method according to claim 8, wherein the original image is divided into a first side region and a second side region according to a vertical central line, and at least one sub-image of the first side region is first fetched and at least one sub-image of the second side region is then fetched.

12. The method according to claim 11, wherein the sub-images of the second side region are fetched after the sub-images of the first side region are all fetched.

13. The method according to claim 8, wherein the original image comprises M number of columns of original pixels, the main part of the first sub-image comprises (M/2) number of the columns of the original pixels, the border part of the first sub-image comprises Q number of columns of the original image, where M is an even number, and Q is a positive integer, associated with the image processing process and is a positive integer smaller than (M/2); and the Q columns of original pixels are for assisting generating at least one processed pixel corresponding to the (M/2) number of columns of the original pixels.

14. The method according to claim 13, wherein the image processing process comprises a plurality of sequentially performed sub-processes each having a border requirement parameter, and the positive integer Q is a sum of the border requirement parameters.

* * * * *